(12) United States Patent
Nakamura et al.

(10) Patent No.: US 6,744,546 B2
(45) Date of Patent: Jun. 1, 2004

(54) MULTILEVEL LIGHT-INTENSITY MODULATING CIRCUIT

(75) Inventors: Takuya Nakamura, Yokohama (JP); Jun-ichi Kani, Yokohama (JP); Mitsuhiro Teshima, Yokosuka (JP); Noboru Takachio, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 10/321,086

(22) Filed: Dec. 17, 2002

(65) Prior Publication Data

US 2003/0123122 A1 Jul. 3, 2003

(30) Foreign Application Priority Data

Dec. 27, 2001 (JP) ......................................... 2001-397004

(51) Int. Cl.[7] .......................... G02F 1/00; G02F 1/035; H04B 10/04
(52) U.S. Cl. ........................ 359/237; 359/238; 385/2; 398/186
(58) Field of Search ............................... 359/237–239, 359/245; 385/2, 3, 8; 398/180, 182, 183, 188, 186

(56) References Cited

U.S. PATENT DOCUMENTS

| 6,587,248 B1 | * | 7/2003 | Gyoten | ....................... 359/245 |
| 2003/0165001 A1 | * | 9/2003 | Uesaka | ....................... 359/279 |

FOREIGN PATENT DOCUMENTS

| JP | 63005633 | 1/1988 |
| JP | 8181723 | 7/1996 |
| JP | 10209961 | 8/1998 |

OTHER PUBLICATIONS

S. Walkin, et al., "A 10 Gb/s 4–ary ASK Lightwave System," ECOC 97, Conference Publication No. 448, pp. 255–258, Sep. 1997.
K. Hattori, et al., "PLC–Based Optical Add/Drop Switch with Automatic Level Control," IEEE Journal of Lightwave Technology, vol. 17, No. 12, pp. 2562–2571, 1999.
T. Nakamura, et al., "A Novel Optical Transmitter for Quaternary Amplitude Shift Keying," Proceedings of the 2002 IEICE (Institute of Electronics, Information and Communication Engineers) Society Conference, B–10–68, p. 356, 2002 (Summary on separate sheet).

* cited by examiner

Primary Examiner—Georgia Epps
Assistant Examiner—M. Hasan
(74) Attorney, Agent, or Firm—Harness, Dickey & Pierce, P.L.C.

(57) ABSTRACT

A multilevel light-intensity modulating circuit for suppressing the amplitude distortion regarding intermediate levels, caused by the conversion from a multilevel electric signal to a multilevel modulated optical signal. The circuit comprises a section for distributing an input optical carrier into n-channel optical carriers; n light-intensity modulators for modulating intensities of the optical carriers by using input two-level electric signals; a control section for producing a phase difference between the n-channel two-level modulated optical signals; a control section for assigning a different light intensity to each of the n-channel two-level modulated optical signals; and a section for combining the n-channel two-level modulated optical signals obtained via the control sections, and outputting a $2^n$-level modulated optical signal. The phase difference and the different light intensity are defined in advance so as to produce the $2^n$-level modulated optical signal.

13 Claims, 12 Drawing Sheets

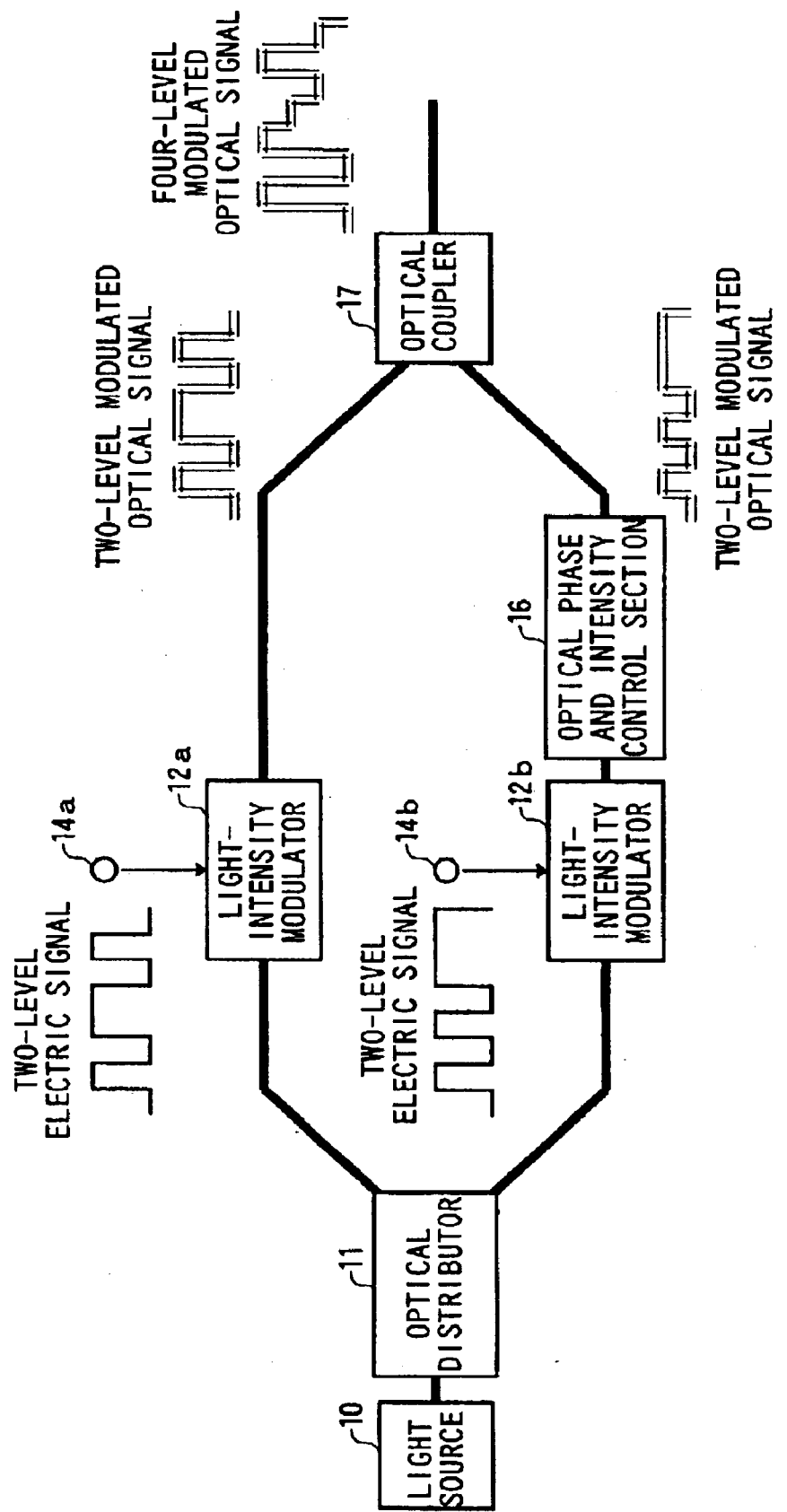

FOUR-LEVEL MODULATED OPTICAL SIGNAL

TWO-LEVEL MODULATED OPTICAL SIGNAL

TWO-LEVEL MODULATED OPTICAL SIGNAL

TWO-LEVEL ELECTRIC SIGNAL

TWO-LEVEL ELECTRIC SIGNAL

FOUR-LEVEL MODULATED OPTICAL SIGNAL

FOUR-LEVEL ELECTRIC SIGNAL

TWO-LEVEL ELECTRIC SIGNAL

TWO-LEVEL ELECTRIC SIGNAL

MULTILEVEL LIGHT-INTENSITY MODULATING CIRCUIT

BACKGROUND OF THE INVENTION

1. Field of the Invention

The present invention relates to a multilevel light-intensity modulating circuit (or apparatus) for producing a multilevel modulated optical signal.

2. Description of the Related Art

In accordance with the requirements for increasing the transmission capacity in optical communication systems, improvement of the efficiency of using optical bandwidth is required in wavelength-division multiplexed transmission systems, thereby producing an important goal of performing band suppression of the optical spectrum so as to arrange a plurality of wavelength channels at narrow spacing.

In order to achieve this goal, multilevel (or multivalued) signals are used so as to decrease the bit rate, thereby suppressing the spectrum width. For example, in comparison with conventional methods, such as two-level light-intensity modulation methods, when $2^n$ amplitude levels are defined in signal transmission, the same amount of data (as that transmitted in the conventional method) can be transmitted at a bit rate of $2/2^n$ and the spectrum width can also be suppressed to approximately $2/2^n$ as much as the band necessary for the conventional methods.

FIG. 7 shows an example of the structure of the conventional multilevel (here, four-level) light-intensity modulating circuit, where the light source 66 is not included in the modulating circuit (refer to S. Walkin et al., "A 10 Gb/s 4-ary ASK Lightwave System", ECOC 97, Conference Publication No. 448, pp. 255–258, 1997).

In the figure, two two-level (or binary amplitude-shifted) electric signals having the same power are respectively input into two input terminals 61 and 62. The power of one of the two electric signals is attenuated to half by using the attenuator 63, and two signals are then combined by the power combiner 64, thereby producing a four-level (or quaternary amplitude-shifted) electric signal. This four-level electric signal is applied to the light-intensity modulator 65, in which the intensity of an optical carrier output from the light source 66 is modulated, thereby producing a four-level modulated optical signal.

FIGS. 8A to 8D show eye patterns which can be observed in a numerical calculation for producing a four-level electric signal by using two two-level electric signals, and further producing a four-level modulated optical signal.

That is, two two-level electric signals, whose eye patterns are respectively shown in FIGS. 8A and 8B, are electrically combined using a system as shown in FIG. 7, so that a four-level electric signal as shown in FIG. 8C is produced. This signal is used for intensity modulation of the optical carrier, thereby producing a four-level modulated optical signal as shown in FIG. 8D.

Here, a Mach-Zehnder light-intensity modulator is commonly used as the light-intensity modulator 65. FIG. 9A is a diagram showing the response characteristics obtained when the Mach-Zehnder light-intensity modulator is used for two-level intensity modulation. As is clearly shown by the figure, amplitude distortion in each level of mark "1" and mark "0" in the two-level electric signal is suppressed, that is, a two-level modulated optical signal having preferable characteristics is obtained.

However, when intensity modulation of the optical carrier is performed using a four-level electric signal, amplitude distortion at level "0" and level "3" is suppressed, but amplitude distortion at levels "1" and "2" is increased, as shown in FIG. 9B.

In addition, the response characteristics of the Mach-Zehnder light-intensity modulator is non-linear; thus, in order to equalize each interval between adjacent levels in the four-level modulated optical signal, a four-level electric signal, in which the interval between levels "1" and "2" is narrowed in advance, must be produced. This condition is also required when intensity modulation is performed using a multilevel (more than four-level) electric signal, and it is inevitable to suitably define the interval between the intermediate levels, and amplitude distortion should be suppressed.

It is desirable, therefore, to provide a multilevel light-intensity modulating circuit for suppressing the amplitude distortion regarding intermediate levels, caused by the conversion from a multilevel electric signal to a multilevel modulated optical signal.

SUMMARY OF THE INVENTION

The present invention provides a multilevel light-intensity modulating circuit comprising:

an optical distribution section for distributing an input optical carrier into n-channel optical carriers, where n is an integer of 2 or greater;

n light-intensity modulators into which the n-channel optical carriers are respectively input, wherein each light-intensity modulator modulates intensity of the input optical carrier by using an input two-level electric signal and outputs a two-level modulated optical signal;

an optical phase control section for producing a phase difference between the n-channel two-level modulated optical signals which are respectively output from the n light-intensity modulators;

a light-intensity control section for assigning a different light intensity to each of the n-channel two-level modulated optical signals which are respectively output from the n light-intensity modulators; and an optical coupling section for combining the n-channel two-level modulated optical signals obtained via the optical phase control section and the light-intensity control section, and outputting a $2^n$-level modulated optical signal, wherein:

the phase difference produced by the optical phase control section and the different light intensity assigned by the light-intensity control section are defined in advance so as to produce the $2^n$-level modulated optical signal.

The optical phase control section may be positioned at the input or output side of at least one of the n light-intensity modulators.

The light-intensity control section may be positioned at the input or side of at least one of the n light-intensity modulators.

As a typical example, the light-intensity control section has a structure for respectively attenuating the light intensities of (n−1) channel input signals to $1/2, 1/4, \ldots, 1/2^{n-1}$ as high as the original light intensities.

In a specific example, n=2;

the optical distribution section has a distribution ratio of 1:1;

the light-intensity control section defines the light-intensity ratio between the 2-channel modulated optical signals as 2:1±8%;

the optical phase control section provides a phase difference of 90°±3% between the 2-channel modulated optical signals; and the optical coupling section has a structure for coupling the 2-channel modulated optical signals and producing the four-level modulated optical signal.

The present invention also provides a multilevel light-intensity modulating circuit comprising:

an optical distribution section for distributing an input optical carrier into n-channel optical carriers, where n is an integer of 2 or greater;

n light-intensity modulators into which the n-channel optical carriers are respectively input, wherein each light-intensity modulator modulates intensity of the input optical carrier by using an input two-level electric signal and outputs a two-level modulated optical signal;

an optical phase control section for producing a phase difference between the n-channel two-level modulated optical signals which are respectively output from the n light-intensity modulators; and an optical coupling section for combining the n-channel two-level modulated optical signals obtained via the optical phase control section, and outputting a $2^n$-level modulated optical signal, wherein:

a distribution ratio of the optical distribution section, a coupling ratio of the optical coupling section, and the phase difference produced by the optical phase control section are defined in advance so as to produce the $2^n$-level modulated optical signal.

The optical phase control section may be positioned at the input or output side of at least one of the n light-intensity modulators.

In a specific example, n=2;

the optical distribution section has a distribution ratio of a:1;

the optical coupling section has a coupling ratio of b:1, where a·b=2±8%;

the optical phase control, section is positioned at either of input and output sides of one of the two light-intensity modulators, and the optical phase control section provides a phase difference of 90°±3% between the 2-channel modulated optical signals; and the optical coupling section has a structure for coupling the 2-channel modulated optical signals and producing the four-level modulated optical signal.

Either of the above-explained multilevel light-intensity modulating circuits may be integratedly formed on a lithium niobate (LN) substrate, wherein each light-intensity modulator is a Mach-Zehnder light-intensity modulator.

According to the present invention, a plurality of two-level modulated optical signals are produced using two-level electric signals which respectively correspond to the modulated optical signals, and the phases and light intensities of the produced two-level modulated optical signals are controlled so as to combine the optical signals, thereby producing a multilevel modulated optical signal. Accordingly, the suppression of amplitude distortion at marks "1" and "0" of the two-level modulated optical signals is effectively used for suppressing the amplitude distortion at all levels of the multilevel modulated optical signal.

Japanese Unexamined Patent Application, First Publication No. Sho 63-5633 ("Optical Multivalued Communication System") discloses a conventional system in which a plurality of two-level optical signals are produced using different light sources, and the produced two-level optical signals are combined. However, the optical phase relationships between the different light sources are random. In this case, the phase control cannot be substantially performed, thereby producing interference noise when the optical signals are combined.

In contrast, in the present invention, a single optical carrier is divided so as to produce a plurality of two-level optical signals; thus, each phase difference between the optical signals is fixed. Therefore, each phase difference can be controlled, so that no interference noise is generated when the optical signals are combined. In addition, the optical phase difference and the light-intensity ratio between the optical signals can be set to suitable values in advance, thereby minimizing the amplitude distortion and equalizing each level interval.

As explained above, the system disclosed in Sho 63-5633 requires a number of light sources corresponding to the number of multilevels; therefore, the temperature and electrical power must be controlled for each light source, so that the control is complicated and space for installing each light source is necessary. In contrast, the present invention requires only a single light source regardless of the number of multilevels, so that the system structure and control for the multilevel light-intensity modulating circuit can be simplified.

In addition, in the above conventional system, direct modulation is performed; thus, chirp (transient variation in optical wavelength) occurs in accordance with increase of the modulation speed. In contrast, the present invention performs external modulation, so that it is difficult for chirp to occur, and it thus can be applied to high-speed modulation.

On the other hand, in the conventional system disclosed in Japanese Unexamined Patent Application, First Publication No. Hei 10-209961, when the electric signal has amplitude distortion, the distortion is projected onto the output optical signal and also grows (refer to the above-explained "Description of the Related Art"). In contrast, in the present invention, even when the electric signal has amplitude distortion, it is possible to produce an output multilevel signal in which the distortion is suppressed.

BRIEF DESCRIPTION OF THE DRAWINGS

FIG. 1 is a diagram showing the structure of the multilevel light-intensity modulating circuit as the first embodiment of the present invention.

DESCRIPTION OF THE PREFERRED EMBODIMENTS

Figure 2E:
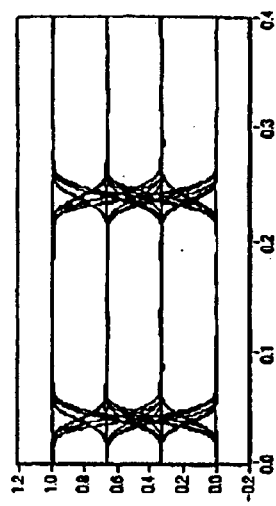
FIGS. 2A to 2E are diagrams showing the processes of producing a four-level modulated optical signal from two-level electric signals in the first embodiment.

Hereinafter, embodiments according to the present invention will be explained with reference to the drawings.

First Embodiment

FIG. 1 is a diagram showing the structure of the multilevel light-intensity modulating circuit as the first embodiment of the present invention. Here, the light source 10 is not a constituent of the modulating circuit. Also in the following embodiments, the light-intensity modulating circuit consists of structural elements other than the light source. In addition, the light-intensity modulating circuit may be called the light-intensity modulating apparatus.

In FIG. 1, the power of an optical carrier output from the light source 10 is divided into two portions by the optical distributor 11, which are respectively input into the light-intensity modulators 12a and 12b.

On the other hand, two two-level electric signals having the same power are input into the light-intensity modulators 12a and 12b via the corresponding input terminals 14a and 14b, so as to modulate the intensity of the optical carrier, thereby producing two two-level modulated optical signals. One of the two-level modulated optical signals is input into the optical phase and intensity control section 16, where the phase of this signal is shifted from the phase of the other signal by +90 or −90 degrees (i.e., the phases of two signals are perpendicular to each other) and the intensity of said one of the two-level modulated optical signals is attenuated to be half as high as the intensity of the other signal.

Accordingly, the light-intensity ratio of the two two-level modulated optical signals is set to 2:1±8%, and the two signals are combined by the optical coupler 17, so that a four-level modulated optical signal is output.

Additionally, in FIG. 1, the optical phase and intensity control section 16 is positioned at the output side of the light-intensity modulator 12b; however, the optical phase and intensity control section 16 may be positioned at the input side of the light-intensity modulator 12b, where similar operation can be performed in either case. Similarly, the optical phase and intensity control section 16 may be positioned at the input or output side of the light-intensity modulator 12a.

Below, the reason for defining the phase difference between two two-level modulated optical signals as 90 degrees will be explained.

Figure 10:
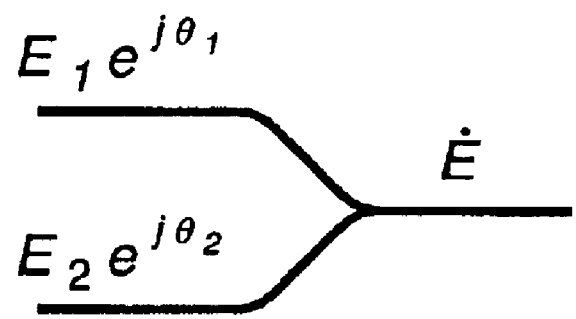
FIG. 10 is a diagram showing the definition between the input and output electric fields assigned to the paths for two two-level modulated optical signals.

When n is 2 in the $2^n$ light-intensity modulating circuit, the electric field power of each path is defined as shown in FIG. 10.

The output electric field $\dot{E}$ is defined by the following formula:

$$\dot{E} = E_1 e^{j\theta_1} + E_2 e^{j\theta_2}$$

Therefore, the electric field power $|E|^2$ is defined as:

$$|E|^2 = (E_1 \cos\theta_1 + E_2 \cos\theta_2)^2 + (E_1 \sin\theta_1 + E_2 \sin\theta_2)^2$$

$$= E_1^2 \cos^2\theta_1 + 2E_1 E_2 \cos\theta_1 \cos\theta_2 + E_2^2 \cos^2\theta_2$$

$$+ E_1^2 \sin^2\theta_1 + 2E_1 E_2 \sin\theta_1 \sin\theta_2 + E_2^2 \sin^2\theta_2$$

$$= E_1^2 + E_2^2 + 2E_1 E_2 (\cos\theta_1 \cos\theta_2 + \sin\theta_1 \sin\theta_2)$$

$$= E_1^2 + E_2^2 + 2E_1 E_2 \cos(\theta_1 - \theta_2)$$

Figure 11:
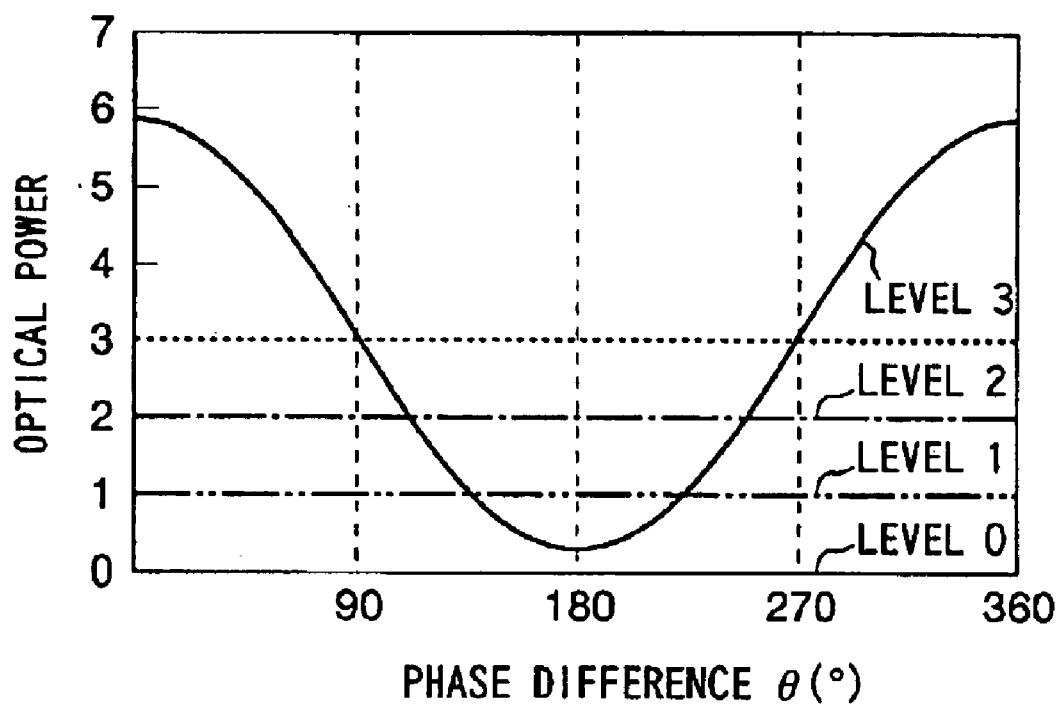
FIG. 11 is a graph showing the relationship between the optical power of each level and phase difference.

FIG. 11 shows the relationship between the optical power of each level and phase difference $\theta(=\theta_1-\theta_2)$ when the light-intensity ratio of $E_1$ to $E_2$ is set as $E_1 : E_2 = 1:2$ (in the vertical axis of the graph, a larger numeral indicates higher power).

As for levels "1" and "2", $E_1$ or $E_2$ is zero; thus, according to the above formula, the output optical power is fixed regardless of phase difference. Here, two two-level modulated optical signals are coupled by the optical coupler 17, and as for level "3", the output optical power varies due to the phase difference between the optical signals, which is present when the signals are coupled.

The above formula also indicates that the optical power of level "3" sinusoidally varies with respect to the phase difference (along the horizontal axis). According to the above formula and FIG. 11, in order to equalize each interval between the adjacent levels, the phase difference should be ±90°.

FIGS. 2A to 2E show eye patterns of two two-level electric signals (see FIGS. 2A and 2B), two two-level modulated optical signals (see FIGS. 2C and 2D), and a four-level modulated optical signal (see FIG. 2E), which were obtained by a numerical calculation relating to the present embodiment.

Figure 2C:
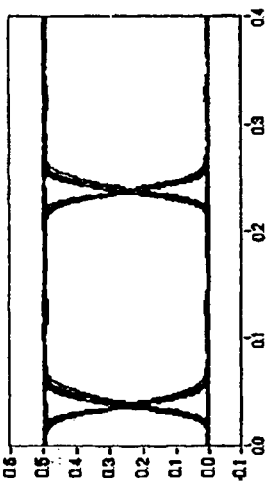
Figure 2D:
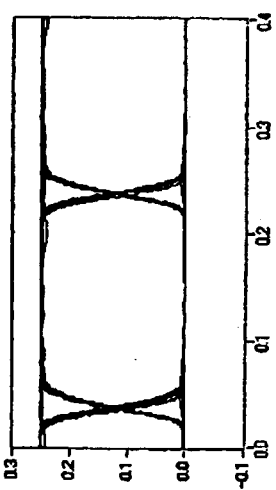
Figure 2A:
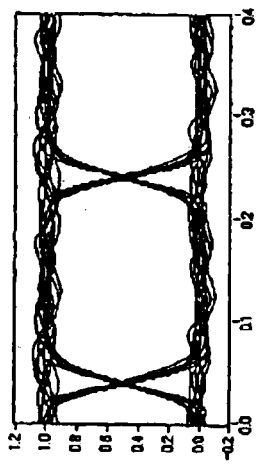
Figure 2B:
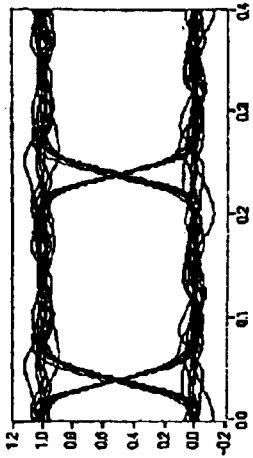

In the present embodiment, the light-intensity modulators 12a and 12b perform usual light-intensity modulation using the two-level electric signal. Therefore, as shown in FIGS. 2C and 2D, the amplitude distortion for mark "1" and space "0" can be suppressed. After that, the phase and light intensity of the two two-level modulated optical signals are adjusted and the two two-level modulated optical signals are combined. Therefore, as shown in FIG. 2E, the amplitude distortion of each level of the four-level modulated optical signal can also be suppressed.

Here, in both numerical calculations (shown by FIGS. 2A to 2E and by FIGS. 8A to 8D), the corresponding two-level electric signals have the same code sequence and have an eye opening penalty of 0.5 dB. Under these conditions, in the conventional example, the four-level modulated optical signal had an eye opening penalty of 2.2 dB; however, in the present embodiment, the four-level modulated optical signal had an eye opening penalty of 0.2 dB. Therefore, it was confirmed that waveform degradation was greatly improved. Here, the eye opening penalty of the four-level modulated optical signal was calculated by (i) calculating the degree of eye opening for each level interval (i.e., three intervals between levels 0–1, 1–2, and 2–3), and calculating the following formula with the minimum degree of eye opening as the worst value:

$$10 \log_{10}(\text{worst value of degree of eye opening}/(1/3)) \quad [\text{dB}]$$

Figure 7:
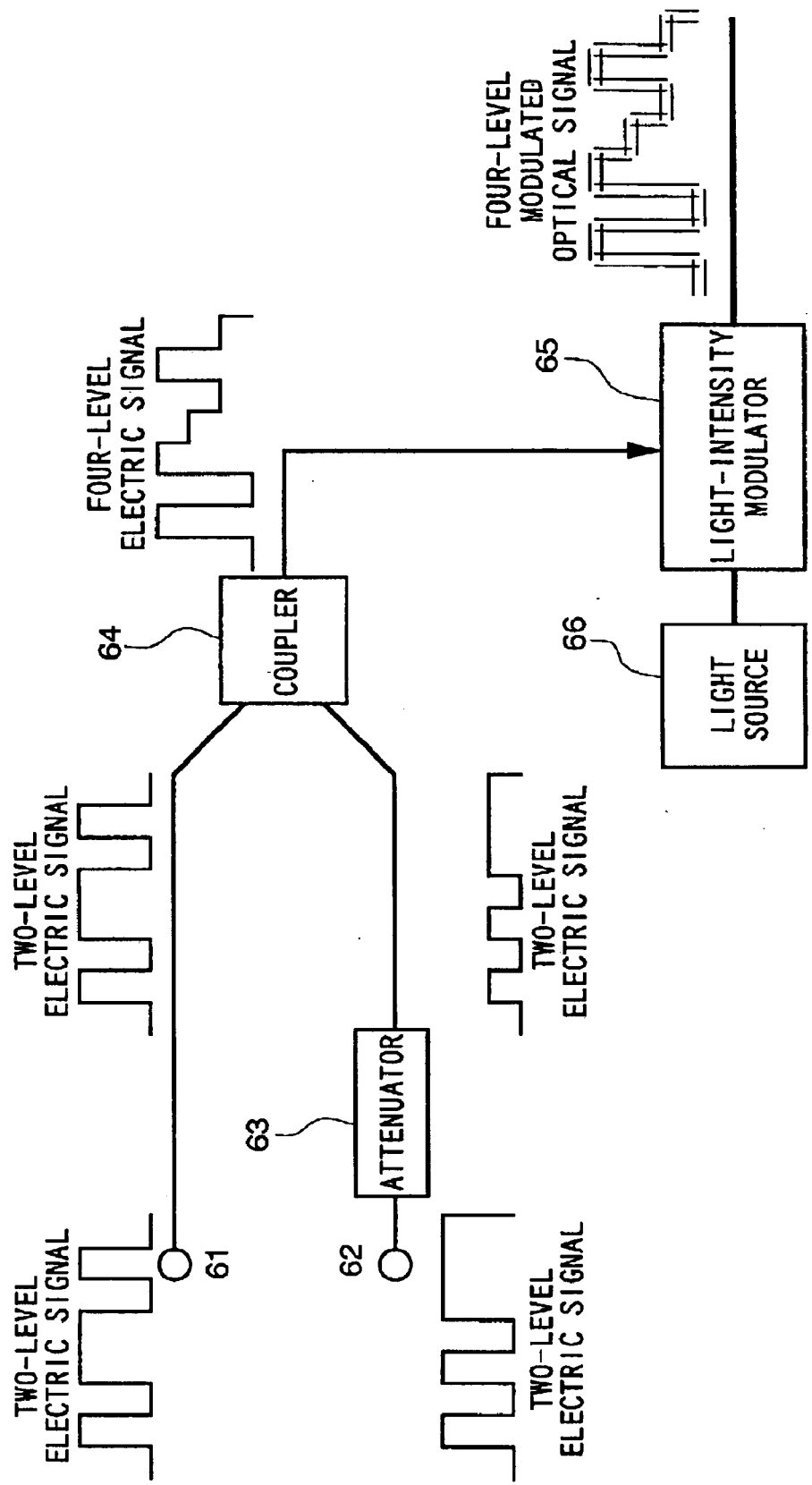
FIG. 7 shows an example of the structure of the conventional multilevel (four-level) light-intensity modulating circuit.
Figure 8D:
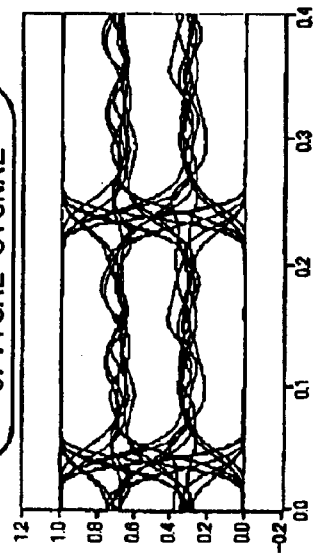
FIGS. 8A to 8D are diagrams showing the processes of producing a four-level modulated optical signal from two-level electric signals in the conventional example.
Figure 8C:
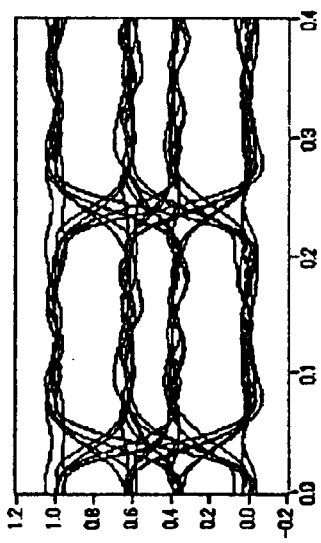
Figure 8A:
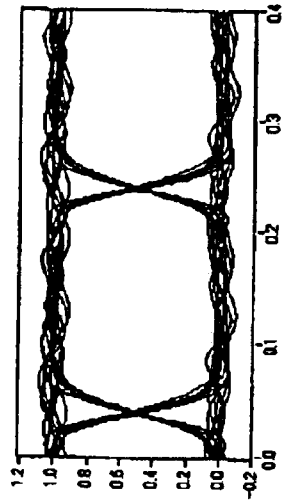
Figure 8B:
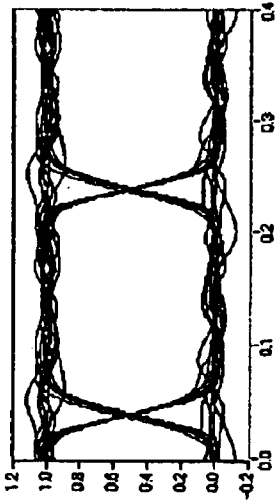
Figure 9A:
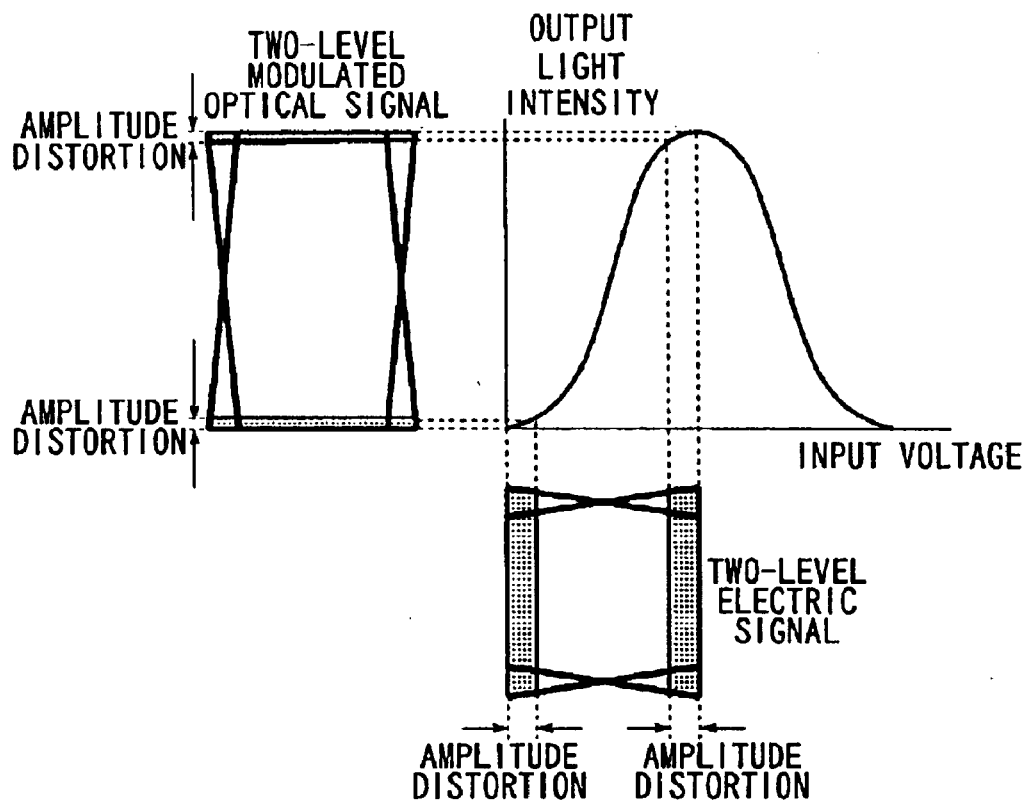
FIGS. 9A and 9B are diagrams showing the characteristics between the input voltage and the output light intensity of the Mach-Zehnder light-intensity modulator.
Figure 9B:
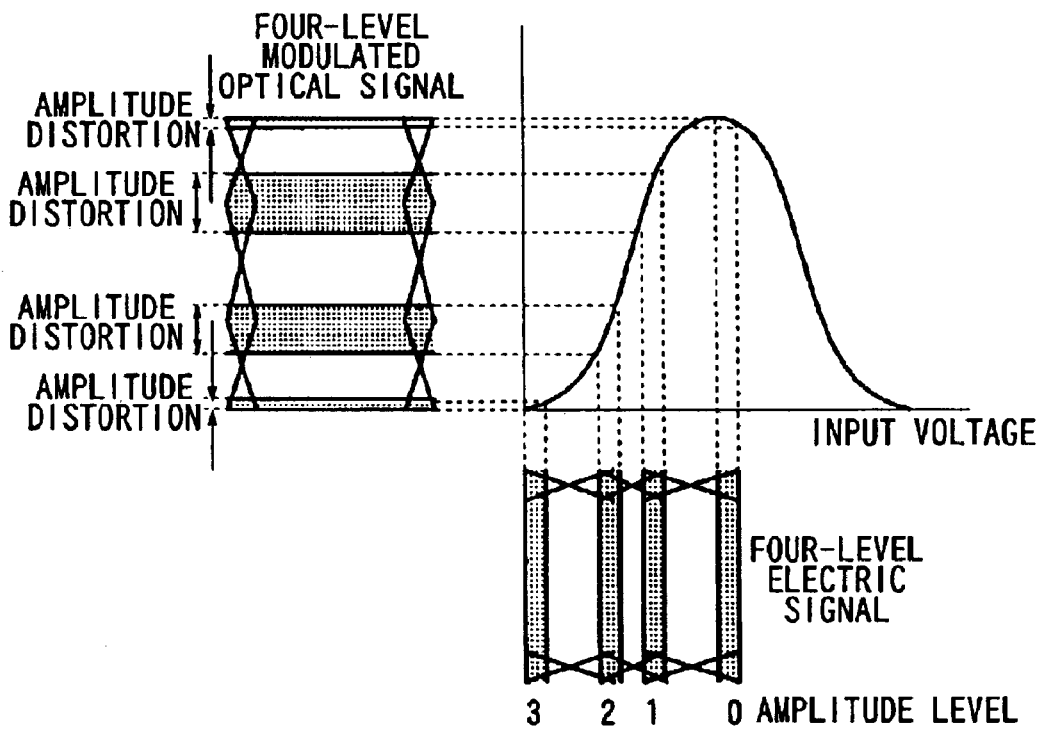

As another comparative example, two-level electric signals, by which a four-level modulated optical signal having an eye opening penalty of 0.52 dB was output in the conventional four-level light-intensity modulating circuit as explained by FIG. 7, was input into the four-level light-intensity modulating circuit of the present embodiment. More specifically, errors were intentionally added to the adjusted amount of light intensity and phase difference and the relevant eye opening penalty was calculated, which was compared with the eye opening penalty of the conventional example, so as to determine a range in which the present embodiment can produce superior results, that is, to determine a permittable error relating to the present invention.

Figure 12:
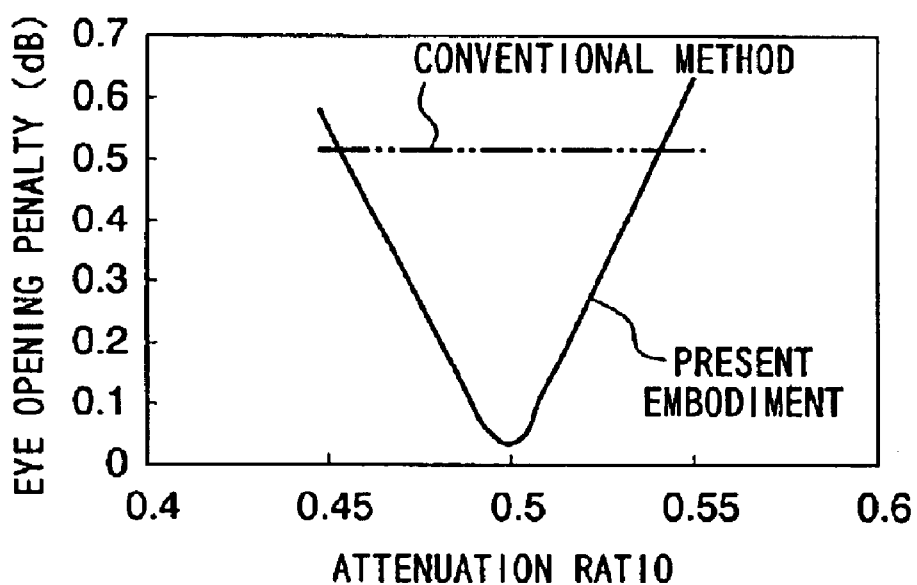
FIG. 12 is a graph showing the relationships between the error in the attenuation ratio and the eye opening penalty.

Regarding the light-intensity control, as is clearly shown by the graph in FIG. 12, the optimum attenuation ratio of light intensity (i.e., the ratio with respect to the original intensity defined as 1) is 0.5 at which the eye opening penalty is minimum. However, as the attenuation ratio departs from the optimum value (i.e., as the error increases), the eye opening penalty increases. In a range of the attenuation ratio from 0.46 to 0.54, the present embodiment has smaller eye opening penalty in comparison with the conventional example. That is, superior results can be obtained by the present embodiment in comparison with the conventional example, within an error range of approximately ±8% with respect to the optimum attenuation ratio.

Figure 13:
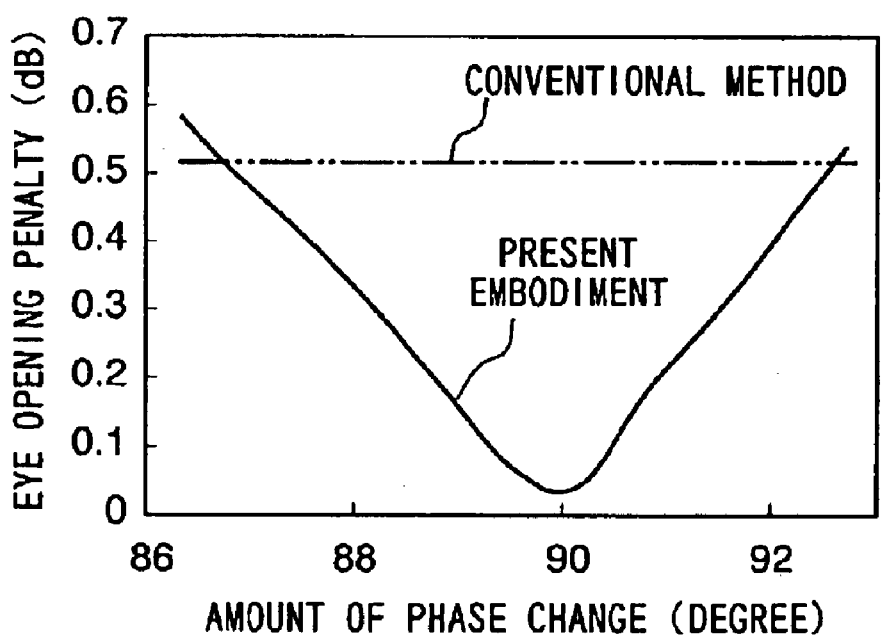
FIG. 13 is a graph showing the relationships between the error in the amount of phase difference and the eye opening penalty.

Regarding the phase control, as is clearly shown by the graph in FIG. 13, the optimum amount of phase change is 90° at which the eye opening penalty is minimum; however, as the amount of phase change departs from the optimum value, the eye opening penalty increases. In a range of the amount of phase change from 87° to 93°, the present embodiment has smaller eye opening penalty in comparison with the conventional example. That is, superior results can be obtained by the present embodiment in comparison with the conventional example, within an error range of approximately ±3% with respect to the optimum amount of phase change.

Second Embodiment

Figure 3:
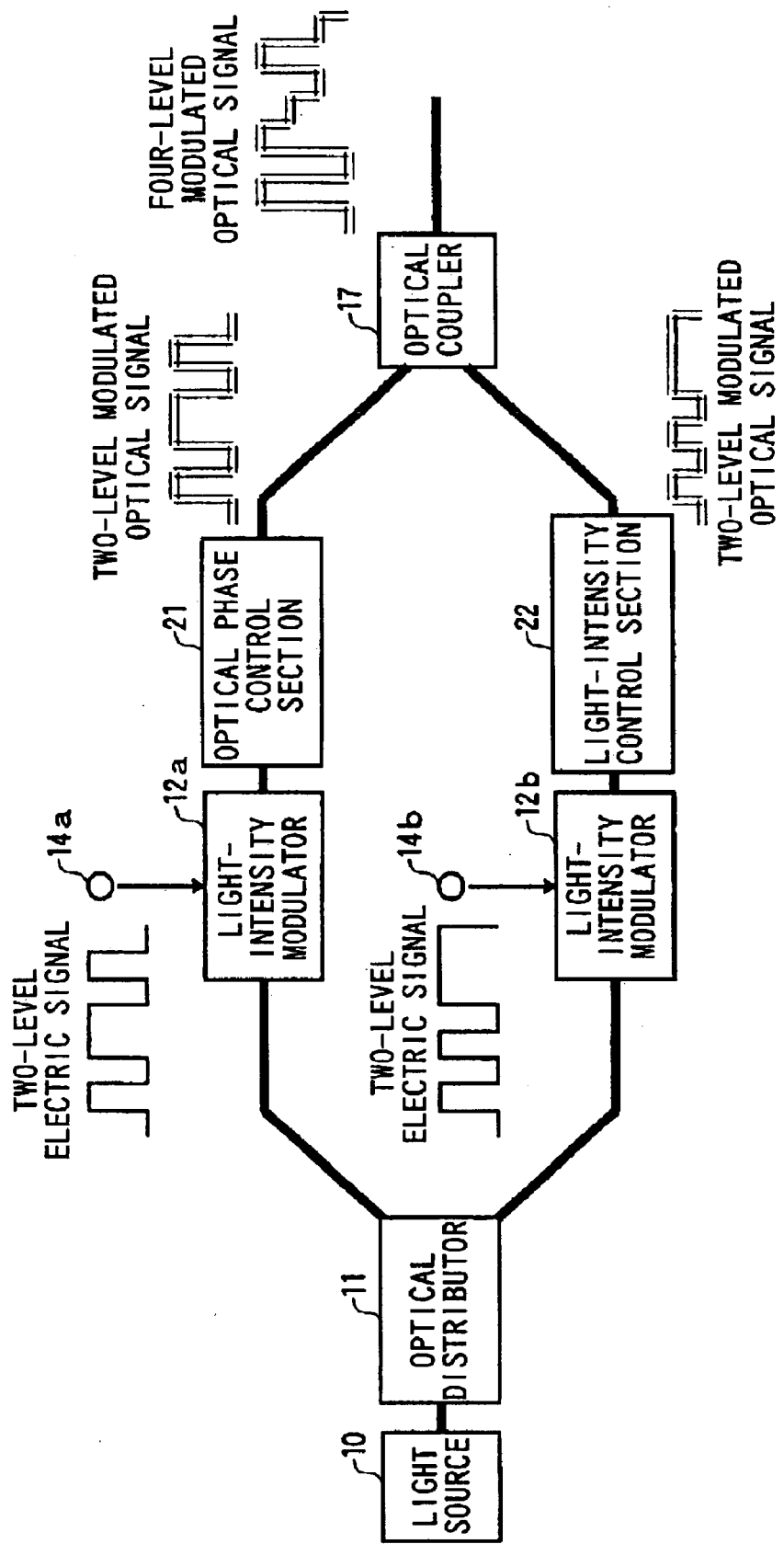
FIG. 3 is a block diagram showing the structure of the multilevel light-intensity modulating circuit as the second embodiment of the present invention.

FIG. 3 shows the structure of the multilevel light-intensity modulating circuit as the second embodiment of the present invention.

The distinctive feature of the present embodiment is that (the function of) the optical phase and intensity control section 16 in the first embodiment is divided into the optical phase control section 21 and the light-intensity control section 22, which are respectively positioned at the output sides of the light-intensity modulators 12a and 12b.

The position of the optical phase control section 21 may be either of the input and output sides of the light-intensity modulator 12a, and the position of the light-intensity control section 22 may also be either of the input and output sides of the light-intensity modulator 12b. In addition, both the optical phase control section 21 and the light-intensity control section 22 may be positioned at one of the light-intensity modulators.

The optical phase control section 21 may have a structure for adjusting the optical path length or a structure for controlling the phase by adding a phase control bias to an optical phase control device.

The light-intensity control section 22 may be an attenuator for fixedly attenuating the light intensity to half, or may use a variable attenuator such as a Mach-Zehnder interferometer (refer to K. Hattori et al., "PLC-Based Optical Add/Drop Switch with Automatic Level Control", IEEE Journal of Lightwave Technology, vol.17, No. 12, pp. 2562–2571, 1999) so as to adjust the light intensity by adding and controlling a bias voltage.

Third Embodiment

Figure 4:
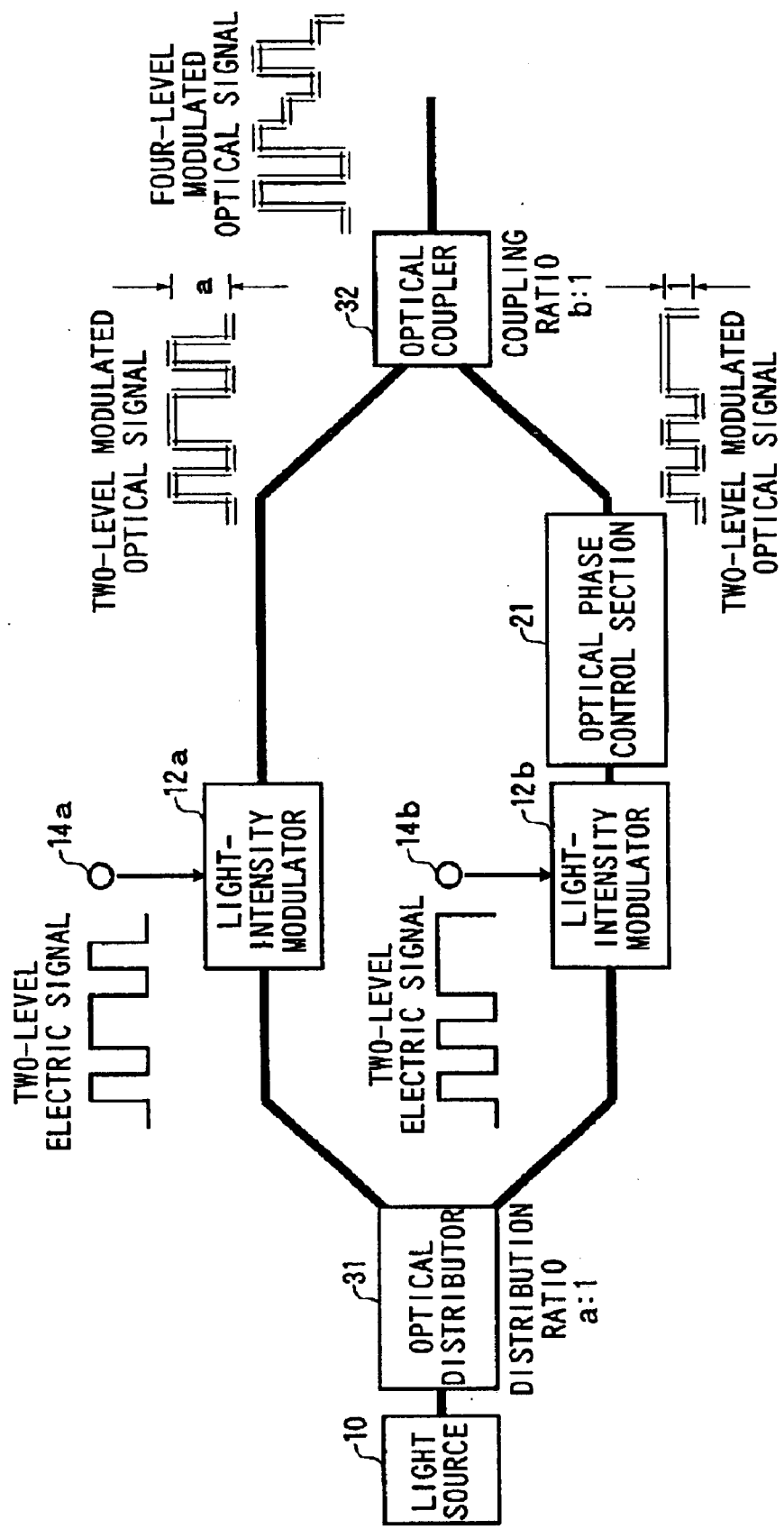
FIG. 4 is a block diagram showing the structure of the multilevel light-intensity modulating circuit as the third embodiment of the present invention.

FIG. 4 shows the structure of the multilevel light-intensity modulating circuit as the third embodiment of the present invention.

The distinctive feature of the present embodiment is to use the optical distributor 31 having a distribution ratio of a:1 and the optical coupler 32 having a coupling ratio of b:1, instead of using the optical distributor 11, the light-intensity control section 22, and the optical coupler 17, which are used in the above-explained second embodiment. Here, "a" and "b" in each ratio are fixed values which satisfy the following formula:

$$a \cdot b = 2(\pm 8\%)$$

Accordingly, the two two-level modulated optical signals output from the light-intensity modulators 12a and 12b can be combined with a controlled light-intensity ratio of 2:1±8%, so as to produce a four-level modulated optical signal.

The optical phase control section 21 may be positioned at any one of the light-intensity modulators 12a and 12b, and at either of the input and output sides of the relevant light-intensity modulator.

Fourth Embodiment

Figure 5:
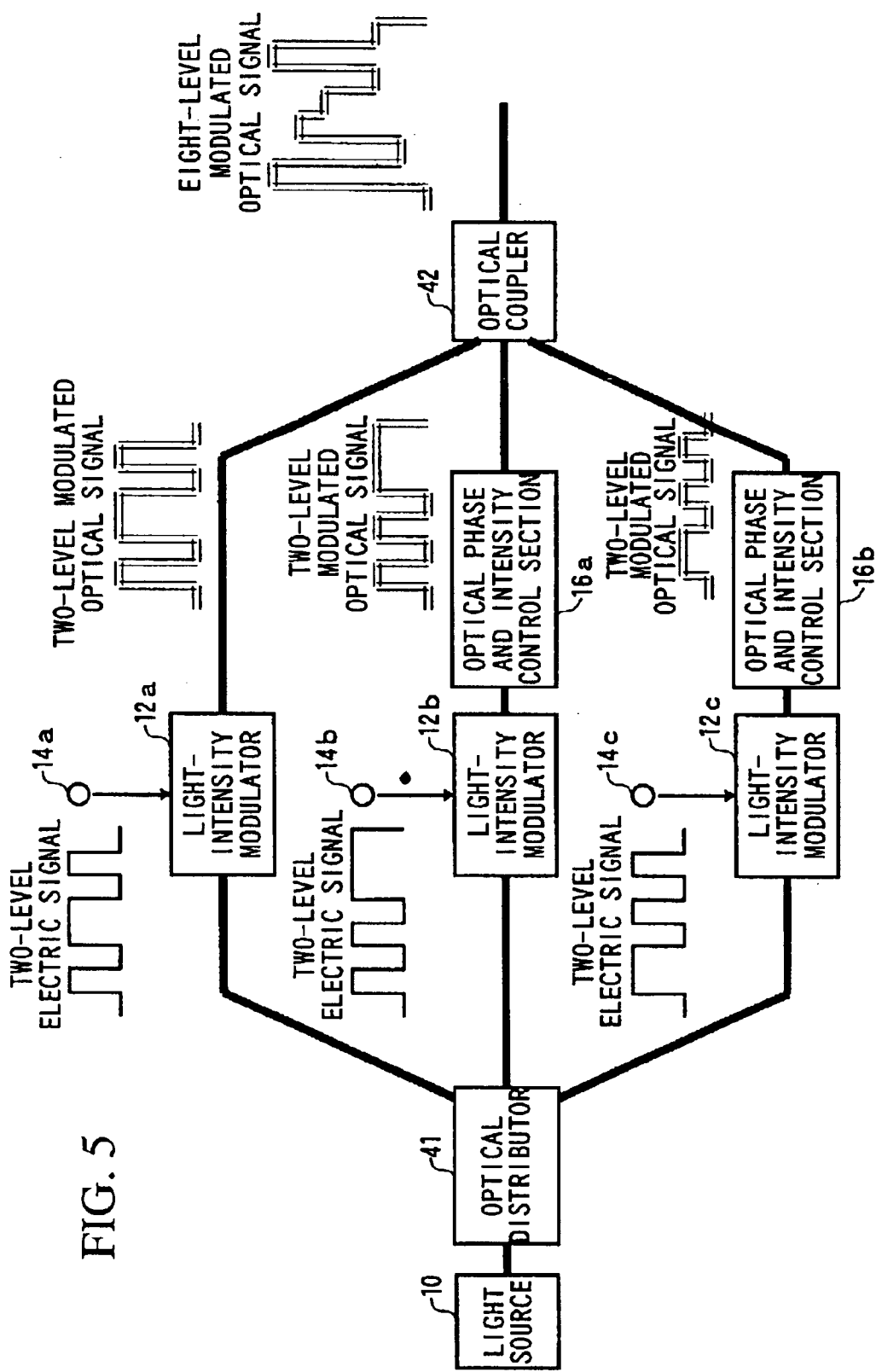
FIG. 5 is a block diagram showing the structure of the multilevel light-intensity modulating circuit as the fourth embodiment of the present invention.

FIG. 5 shows the structure of the multilevel light-intensity modulating circuit as the fourth embodiment of the present invention.

In the figure, the power of the optical carrier output from the light source 10 is divided by the optical distributor 41 into three portions, which are respectively input into the light-intensity modulators 12a, 12b, and 12c. On the other hand, three two-level electric signals having the same power are respectively input into the light-intensity modulators 12a, 12b, and 12c via the corresponding input terminals 14a, 14b, and 14c, so as to perform light-intensity modulation of the optical carrier.

The phases of the two-level modulated optical signals output from the light-intensity modulators 12b and 12c are respectively controlled by the optical phase and intensity control sections 16a and 16b. The light intensity of the two-level modulated optical signal from the light-intensity modulator 12b is attenuated to half by the optical phase and intensity control section 16a, and the light intensity of the two-level modulated optical signal from the light-intensity modulator 12c is attenuated to a quarter by the optical phase and intensity control section 16b.

These signals and the two-level modulated optical signal output from the light-intensity modulator 12a are combined by the optical coupler 42, thereby producing an eight-level modulated optical signal.

An example of the phase difference produced by the optical phase and intensity control sections 16a and 16b will be explained below.

Figure 14:
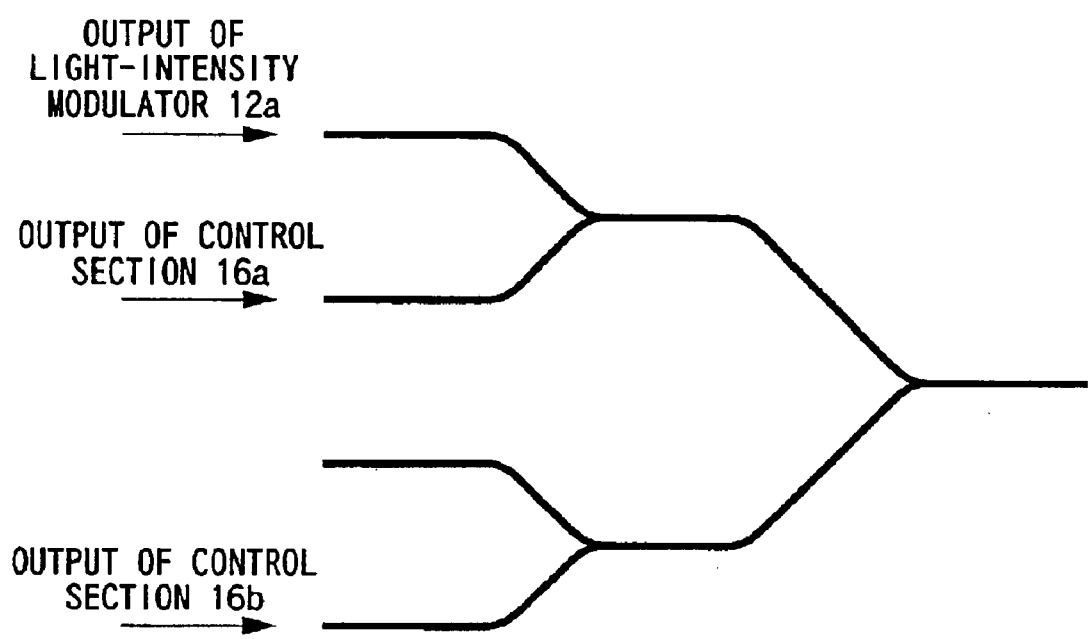
FIG. 14 is a diagram showing an example of the general structure of the optical coupler 42 in FIG. 5.

It is assumed that the optical coupler 42 first combines the outputs from the light-intensity modulator 12a and the optical phase and intensity control section 16a and then combines this combined output and the output from the optical phase and intensity control section 16b (refer to FIG. 14 which illustrates the general structure of the optical coupler 42 in this case), and that the phase of the optical signal output from the light-intensity modulator 12a is 0°. Under these conditions, the relative phase (with respect to the phase (0°) of the signal from the light-intensity modulator 12a) of the output from the optical phase and intensity control section 16a is controlled to be 90°, and the relative phase of the output from the optical phase and intensity control section 16b is dynamically controlled according to each output level from 0 to 7, more specifically, the relative phases at levels 3, 5, and 7 are respectively controlled to be 180°, 90°, and 135°.

Below, such dynamic phase control will be explained in more detail.

Table 1 shows the relationships between the output levels (relating to the eight-level modulated optical signal) and the adjusted amount of phase.

As for the optical distributor 41 and the optical coupler 42, those for defining specific distribution and coupling ratios may be employed, as explained in the third embodiment. In particular, if it is defined that three two-level modulated optical signals are combined at a coupling ratio of 4:2:1, no light-intensity control section is necessary.

Generally, if (i) the optical distributor 41 and the optical coupler 42 are respectively n-channel distribution and n-channel coupling devices, and (ii) n light-intensity modulators and any number of control devices for controlling the phase and light intensity are used in combination, so as to perform phase control according to each output value and to define the light-intensity ratio to $1:2: \ldots :2^{n-1}$, then a $2^n$-level modulated optical signal can be produced from n two-level modulated optical signals. Here, each level interval of the $2^n$-level modulated optical signal can be defined by controlling the light intensity of (n−1) channel signals input into the corresponding devices for controlling the light intensity.

TABLE 1

| column 1 output level | column 2 two-level modulated optical signal | | | column 3 combined signal of outputs | | column 4 phase condition for signal from optical phase and intensity control section 16b, by which phase of this signal is perpendicular to phase of combined signal |
|---|---|---|---|---|---|---|
| | from light-intensity modulator 12a | from optical phase and intensity control section 16a | from optical phase and intensity control section 16b | from light-intensity modulator 12a and optical phase and intensity control section 16a | | |
| | | | | level | phase | |
| 0 | 0 | 0 | 0 | 0 | 0° | |
| 1 | 0 | 0 | 1 | 0 | 0° | |
| 2 | 0 | 1 | 0 | 2 | 90° | |
| 3 | 0 | 1 | 1 | 2 | 90° | 180° |
| 4 | 1 | 0 | 0 | 4 | 0° | |
| 5 | 1 | 0 | 1 | 4 | 0° | 90° |
| 6 | 1 | 1 | 0 | 6 | 45° | |
| 7 | 1 | 1 | 1 | 6 | 45° | 135° |

In Table 1, columns 1 and 2 indicate output level values at each output level of three output signals (i.e., three two-level modulated optical signals output from the light-intensity modulator 12a, and the optical phase and intensity control sections 16a and 16b). Column 3 indicates the level value and phase at each output level of the signal obtained by combining the signal from the light-intensity modulator 12a and the signal from the optical phase and intensity control section 16a by the optical coupler 42. When this combined signal and the signal output from the optical phase and intensity control section 16b are further combined, the phases of two signals should be perpendicular to each other so as to equalize each level interval.

This condition can be satisfied when the optical phase and intensity control section 16b respectively assigns the above-explained relative phases 180°, 90°, and 135° to levels 3, 5, and 7. Here, in the other output levels, either of the combined signal and the output from the optical phase and intensity control section 16b has a level value of 0; thus, it is unnecessary to consider the phase difference.

The optical phase and intensity control section 16a may be positioned at either of the input and output sides of the light-intensity modulator 12b, and the optical phase and intensity control section 16b may also be positioned at either of the input and output sides of the light-intensity modulator 12c. In addition, similar to the second embodiment, each optical phase and intensity control section may be divided into an optical phase control section and a light-intensity control section which may be separately positioned.

Fifth Embodiment

Figure 6:
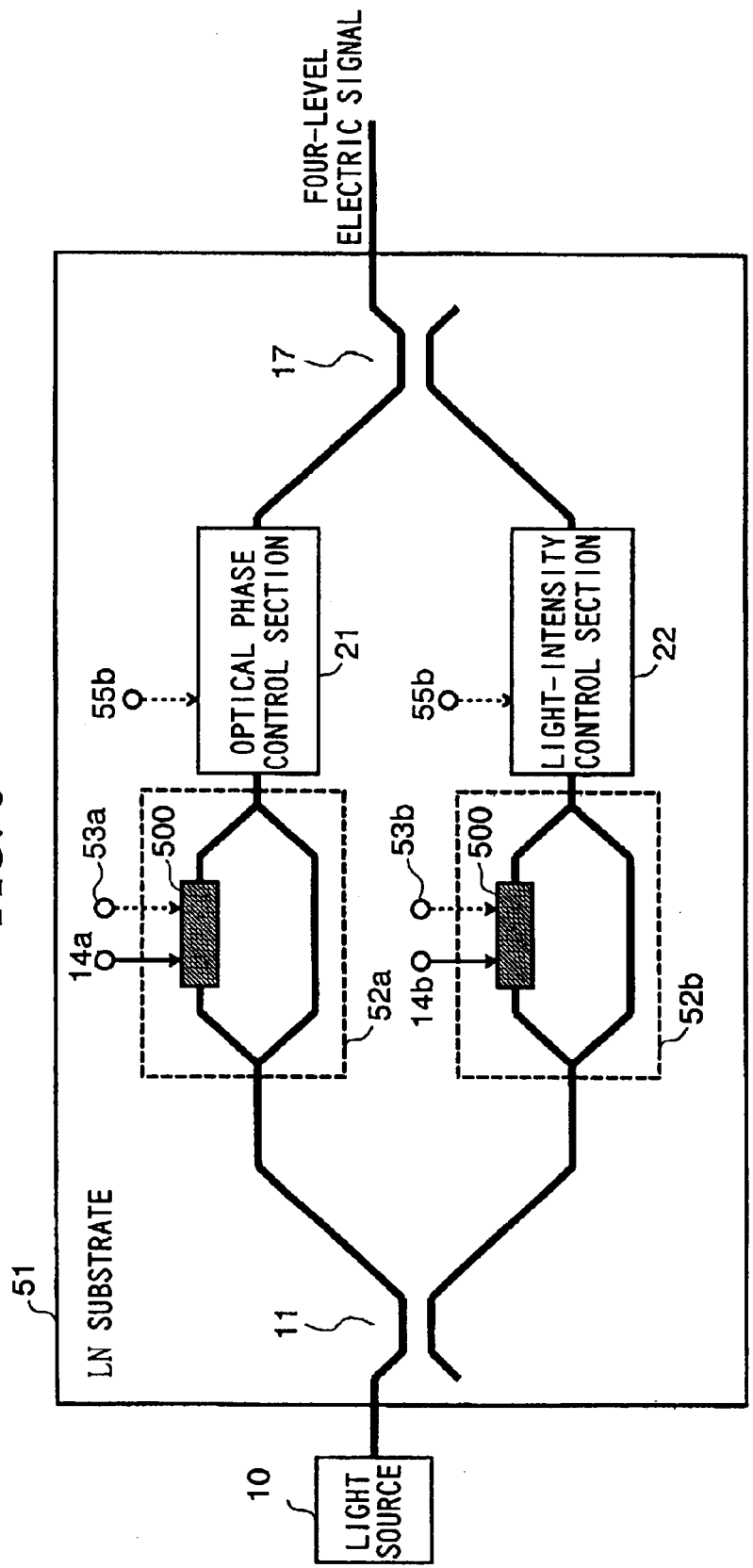
FIG. 6 is a block diagram showing the structure of the multilevel light-intensity modulating circuit as the fifth embodiment of the present invention.

FIG. 6 shows the structure of the multilevel light-intensity modulating circuit as the fifth embodiment of the present invention.

The present embodiment relates to the second embodiment for producing a four-level modulated optical signal, and the distinctive feature of the present embodiment is that the optical distributor 11, the Mach-Zehnder light-intensity modulators 52a and 52b, the optical phase control section 21, the light-intensity control section 22, and the optical coupler 17 are formed on an LN substrate 51, and these devices are connected via optical waveguides.

In this structure, two two-level electric signals having the same power are respectively input from the input terminals 14a and 14b into the Mach-Zehnder light-intensity modulators 52a and 52b (reference numeral 500 indicates an electrode to which an modulating signal is added), so that optical carriers are modulated, which were divided by the optical distributor 11. Here, the DC biases applied via the bias terminals 53a and 53b are respectively defined in a manner such that when the electric signals input from the input terminals 14a and 14b are zero, the light intensities of the outputs from the Mach-Zehnder light-intensity modulators 52a and 52b are approximately zero.

The optical phase control section 21 may have a structure for controlling the optical path length or a structure for controlling the phase by applying a phase control bias to an optical phase control devise (in this case, the phase control bias is applied via the terminal 55*a*).

When a variable attenuator such as a Mach-Zehnder interferometer is used as the light-intensity control section 22, the light intensity is adjusted by applying and controlling a bias voltage (in this case, the light-intensity control bias is applied via the terminal 55*b*).

What is claimed is:

1. A multilevel light-intensity modulating circuit comprising:

an optical distribution section for distributing an input optical carrier into n-channel optical carriers, where n is an integer of 2 or greater;

n light-intensity modulators into which the n-channel optical carriers are respectively input, wherein each light-intensity modulator modulates intensity of the input optical carrier by using an input two-level electric signal and outputs a two-level modulated optical signal;

an optical phase control section for producing a phase difference between the n-channel two-level modulated optical signals which are respectively output from the n light-intensity modulators;

a light-intensity control section for assigning a different light intensity to each of the n-channel two-level modulated optical signals which are respectively output from the n light-intensity modulators; and an optical coupling section for combining the n-channel two-level modulated optical signals obtained via the optical phase control section and the light-intensity control section, and outputting a $2^n$-level modulated optical signal, wherein:

the phase difference produced by the optical phase control section and the different light intensity assigned by the light-intensity control section are defined in advance so as to produce the $2^n$-level modulated optical signal.

2. A multilevel light-intensity modulating circuit as claimed in claim 1, wherein the optical phase control section is positioned at the input side of at least one of the n light-intensity modulators.

3. A multilevel light-intensity modulating circuit as claimed in claim 1, wherein the optical phase control section is positioned at the output side of at least one of the n light-intensity modulators.

4. A multilevel light-intensity modulating circuit as claimed in claim 1, wherein the light-intensity control section is positioned at the input side of at least one of the n light-intensity modulators.

5. A multilevel light-intensity modulating circuit as claimed in claim 1, wherein the light-intensity control section is positioned at the output side of at least one of the n light-intensity modulators.

6. A multilevel light-intensity modulating circuit as claimed in claim 1, wherein the light-intensity control section has a structure for respectively attenuating the light intensities of (n−1) channel input signals to 1/2, 1/4, ..., $1/2^{n-1}$ as high as the original light intensities.

7. A multilevel light-intensity modulating circuit as claimed in claim 1, wherein:

n=2;

the optical distribution section has a distribution ratio of 1:1;

the light-intensity control section defines the light-intensity ratio between the 2-channel modulated optical signals as 2:1±8%;

the optical phase control section provides a phase difference of 90°±3% between the 2-channel modulated optical signals; and the optical coupling section has a structure for coupling the 2-channel modulated optical signals and producing the four-level modulated optical signal.

8. A multilevel light-intensity modulating circuit as claimed in claim 1, which is integratedly formed on a lithium niobate (LN) substrate, wherein each light-intensity modulator is a Mach-Zehnder light-intensity modulator.

9. A multilevel light-intensity modulating circuit comprising:

an optical distribution section for distributing an input optical carrier into n-channel optical carriers, where n is an integer of 2 or greater;

n light-intensity modulators into which the n-channel optical carriers are respectively input, wherein each light-intensity modulator modulates intensity of the input optical carrier by using an input two-level electric signal and outputs a two-level modulated optical signal;

an optical phase control section for producing a phase difference between the n-channel two-level modulated optical signals which are respectively output from the n light-intensity modulators; and an optical coupling section for combining the n-channel two-level modulated optical signals obtained via the optical phase control section, and outputting a $2^n$-level modulated optical signal, wherein:

a distribution ratio of the optical distribution section, a coupling ratio of the optical coupling section, and the phase difference produced by the optical phase control section are defined in advance so as to produce the $2^n$-level modulated optical signal.

10. A multilevel light-intensity modulating circuit as claimed in claim 9, wherein the optical phase control section is positioned at the input side of at least one of the n light-intensity modulators.

11. A multilevel light-intensity modulating circuit as claimed in claim 9, wherein the optical phase control section is positioned at the output side of at least one of the n light-intensity modulators.

12. A multilevel light-intensity modulating circuit as claimed in claim 9, wherein:

n=2;

the optical distribution section has a distribution ratio of a:1;

the optical coupling section has a coupling ratio of b:1, where a·b=2±8%;

the optical phase control section is positioned at either of input and output sides of one of the two light-intensity modulators, and the optical phase control section provides a phase difference of 90°±3% between the 2-channel modulated optical signals; and the optical coupling section has a structure for coupling the 2-channel modulated optical signals and producing the four-level modulated optical signal.

13. A multilevel light-intensity modulating circuit as claimed in claim 9, which is integratedly formed on a lithium niobate (LN) substrate, wherein each light-intensity modulator is a Mach-Zehnder light-intensity modulator.

* * * * *